US012770326B2

(12) United States Patent
Li et al.

(10) Patent No.: US 12,770,326 B2
(45) Date of Patent: Oct. 20, 2026

(54) METHOD AND DEVICE, EQUIPMENT AND MEDIA FOR DISPLAYING PANORAMA OF POINTS OUTSIDE MODEL

(71) Applicant: Realsee (Beijing) Technology Co., Ltd., Beijing (CN)

(72) Inventors: Yang Li, Beijing (CN); Rui Li, Beijing (CN)

(73) Assignee: Realsee (Beijing) Technology Co., Ltd., Beijing (CN)

(*) Notice: Subject to any disclaimer, the term of this patent is extended or adjusted under 35 U.S.C. 154(b) by 93 days.

(21) Appl. No.: 19/003,493

(22) Filed: Dec. 27, 2024

(65) Prior Publication Data

US 2026/0120398 A1 Apr. 30, 2026

Related U.S. Application Data

(63) Continuation of application No. PCT/CN2023/080479, filed on Mar. 9, 2023.

(30) Foreign Application Priority Data

Sep. 26, 2022 (CN) ......................... 202211170895.4

(51) Int. Cl.
*H04N 13/117* (2018.01)
*G06T 17/00* (2006.01)
(Continued)

(52) U.S. Cl.
CPC .............. *G06T 17/00* (2013.01); *G06V 20/70* (2022.01)

(58) Field of Classification Search
None
See application file for complete search history.

(56) References Cited

U.S. PATENT DOCUMENTS 10,403,005 B2 * 9/2019 Petersen .................... G06T 1/20
2020/0286279 A1 * 9/2020 Sheng ................. G06F 3/04842
2022/0180608 A1 * 6/2022 Wang .................... H04N 13/117

FOREIGN PATENT DOCUMENTS

CN 110619659 A 12/2019
CN 112465971 A 3/2021
(Continued)

OTHER PUBLICATIONS

Patent Cooperation Treaty, International Search Report and Written Opinion, International Application No. PCT/CN2023/080479 (May 31, 2023).

*Primary Examiner* — Martin Mushambo
(74) *Attorney, Agent, or Firm* — Leydig, Voit & Mayer, Ltd.

(57) ABSTRACT

The present disclosure provides a method, device, equipment, and medium for displaying a panorama of points outside a model. The method includes: acquiring a target space model including a plurality of first points and at least one guide label, where each guide label of the at least one guide label corresponds to a second point associated with a coordinate position outside the target space model, and each guide label of the at least one guide label corresponds to at least one preset first point; in response to a panoramic display of the target space model reaching the at least one preset first point, acquiring a panorama of the second point corresponding to the guide label based on receiving a triggering instruction for the guide label; and initiating display of the panorama corresponding to the second point in the target space model.

20 Claims, 3 Drawing Sheets

(51) Int. Cl.
*G06V 20/70* (2022.01)
*H04N 13/183* (2018.01)

(56) References Cited

FOREIGN PATENT DOCUMENTS

| | | | |
|---|---|---|---|
| CN | 112907755 | A | 6/2021 |
| CN | 115097975 | A | 9/2022 |
| CN | 115512046 | A | 12/2022 |
| WO | 2021249390 | A1 | 12/2021 |

* cited by examiner

METHOD AND DEVICE, EQUIPMENT AND MEDIA FOR DISPLAYING PANORAMA OF POINTS OUTSIDE MODEL

CLAIM OF PRIORITY

This application is a continuation of International Application No. PCT/CN2023/080479, filed on Mar. 9, 2023, which claims the benefit of priority to Chinese Patent Application No. 202211170895.4, filed on Sep. 26, 2022. The entire contents of the above applications are incorporated herein by reference.

FIELD

The present disclosure relates to the field of virtual reality (VR) technology, and in particular, to a method and device, equipment, and medium for displaying a panorama of points outside a model.

BACKGROUND

For virtual reality (VR) in a space with borders (for example, a house, etc.), it is usually based on shooting within the space, and the generated points are also internal points in the space. The space model obtained by internal-point-based rendering has a border as the boundary (for example, a house with the wall as the boundary) presents a space model state. However, for a space that also has shooting points outside the space, since the external scenario does not have a model as a carrier, these panoramic points will be lost in the VR panoramic walk mode, and will be unreachable and unperceivable, which wastes point resources and loses the meaning of point setting.

SUMMARY

In order to solve the above technical problems, the present disclosure is proposed. According to embodiments of the present disclosure, a method, device, equipment, and medium for displaying a panorama of points outside a model are provided.

According to one aspect of the embodiment of the present disclosure, a method of displaying a panorama of points outside a model is provided, including: acquiring a target space model including a plurality of first points and at least one guide label, where each of the guide labels corresponds to a second point whose coordinate position is outside the target space model, and each of the guide labels corresponds to at least one preset first point; in response to the panoramic display of the target space model reaching the preset first point, acquiring a panorama of the second point corresponding to the guide label based on received triggering instruction for the guide label; and initiating display of the panorama corresponding to the second point in the target space model.

According to another aspect of the embodiment of the present disclosure, a device for displaying a panorama of points outside a model is provided, including: a model acquiring module, configured to acquire a target space model including a plurality of first points and at least one guide label, where each of the guide labels corresponds to a second point whose coordinate position is outside the target space model, and each of the guide labels corresponds to at least one preset first point; a label guiding module, configured to in response to the panoramic display of the target space model reaching the preset first point, acquire a panorama of the second point corresponding to the guide label based on received triggering instruction for the guide label; and a point displaying module, configured to initiate display of the panorama corresponding to the second point in the target space model.

According to yet another aspect of the embodiments of the present disclosure, an electronic device is provided, which is characterized by including: a memory for storing computer program products; a processor for store computer program products; a memory for executing a computer program product stored in the memory, and when the computer program product is executed, implementing a method for displaying a panorama of points outside a model as described in any embodiment.

According to another aspect of the embodiments of the present disclosure, a computer-readable storage medium is provided, on which computer program instructions are stored, characterized in that, when the computer program instructions are executed by a processor, a method for displaying a panorama of points outside a model as described in any of the above embodiments is implemented.

According to yet another aspect of the embodiments of the present disclosure, a computer program product is provided, including computer program instructions, when the computer program instructions are executed by a processor, a method for displaying a panorama of points outside a model in any of the embodiments is implemented.

Embodiments of the present disclosure will be described in further detail below through the accompanying drawings and examples.

BRIEF DESCRIPTION OF THE DRAWINGS

The above and other objects, features and advantages of the present disclosure will become more apparent through a more detailed description of the embodiments of the present disclosure in conjunction with the accompanying drawings. The accompanying drawings are used to provide further understanding of the embodiments of the present disclosure, and constitute a part of the description. The accompanying drawings are used to explain the present disclosure together with the embodiments of the present disclosure, and do not constitute a limitation of the present disclosure. In the accompanying drawings, the same reference numbers generally represent like parts or steps.

DETAILED DESCRIPTION

Figure 1:
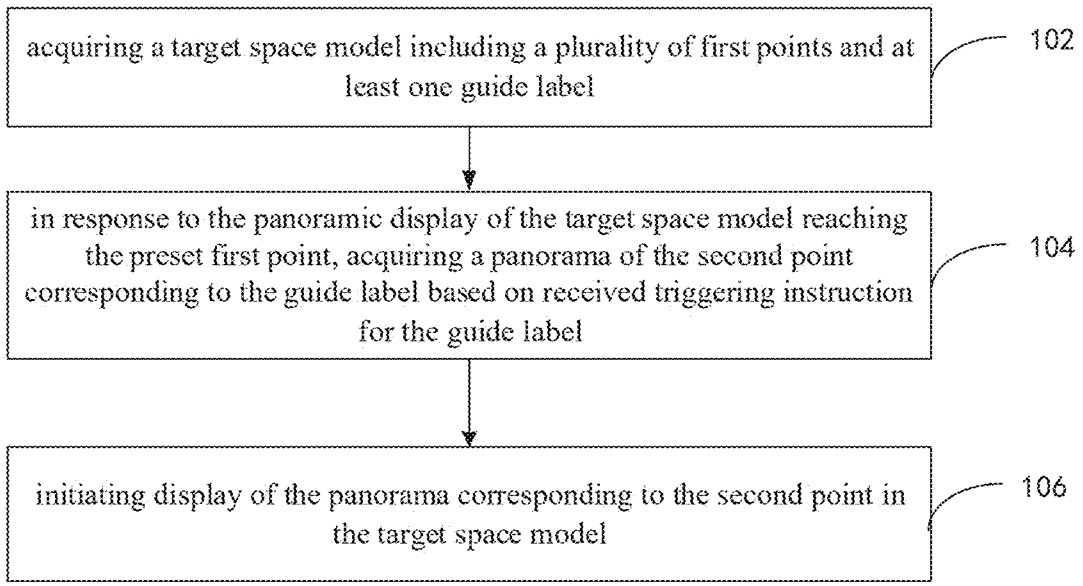
FIG. 1 is a schematic flowchart of a method for displaying a panorama of points outside a model according to an embodiment of the present disclosure.

Hereinafter, exemplary embodiments according to the present disclosure will be described in detail with reference to the accompanying drawings. It will be appreciated by those skilled in the art that the described embodiments are only some embodiments of the present disclosure, rather than all embodiments of the present disclosure, and it should be understood that the present disclosure is not limited to the exemplary embodiments described herein.

It should be noted that the relative arrangement of components and steps, numerical expressions, and numerical values set forth in these embodiments do not limit the scope of the present disclosure unless otherwise specifically stated.

Those skilled in the art can understand that terms such as "first" and "second" in the embodiments of the present disclosure are only used to distinguish different steps, devices or modules, etc., and do not represent any specific technical meaning, nor do they represent the necessary logical sequence therebetween.

It should also be understood that in the embodiments of the present disclosure, "plurality" may refer to two or more than two, and "at least one" may refer to one, two, or more than two.

It should also be understood that any component, data or structure mentioned in the embodiments of the present disclosure may generally be understood to mean one or more unless there is an explicit limitation or contrary inspiration is given in the context.

In addition, the term "and/or" in the present disclosure is only an association relationship describing associated objects, indicating that there may be three relationships, for example, A and/or B, which may mean there are three situations: A alone exists, and A and B exist simultaneously, B alone exists. In addition, the character "/" in the present disclosure generally indicates that the related objects are in an "or" relationship. The data referred to in the present disclosure may include unstructured data such as text, images, videos, etc., or it may be structured data.

As used in this description, the phrase "entity A initiates action B" may refer to entity A issuing instructions to execute action B, but entity A itself may not necessarily execute that action B. For example, the phrase "the point displaying module initiates display of the panorama corresponding to the second point" may refer to the point displaying module causing the display to present the panorama corresponding to the second point, while the point displaying module itself does not need to perform the "displaying" action.

It should also be understood that the description of various embodiments in the present disclosure focuses on the differences between the various embodiments, and the common or similarities between the embodiments may be referred to each other. For the sake of brevity, they will not be repeated one by one.

At the same time, it should be understood that, for convenience of description, the dimensions of various parts shown in the drawings are not drawn according to actual proportional relationships.

The following description of at least one exemplary embodiment is merely illustrative in nature and is in no way intended to limit the disclosure, its application or uses.

Techniques, methods and devices known to those skilled in the art may not be discussed in detail, but where appropriate, such techniques, methods and devices should be considered a part of this description.

It should be noted that similar reference numerals and letters refer to similar items in the following figures, so that once an item is defined in one figure, it does not require further discussion in subsequent figures.

Embodiments of the present disclosure may be applied to computer systems/servers, which may operate with numerous other general purpose or special purpose computing system environments or configurations. Examples of well-known computing systems, environments and/or configurations suitable for use with electronic devices such as computer systems/servers include, but are not limited to: personal computer systems, server computer systems, thin clients, thick clients, handheld or laptop devices, microprocessor-based systems, set-top boxes, programmable consumer electronics, networked personal computers, small computer systems, mainframe computer systems, and distributed cloud computing technology environments including any of the above systems, etc.

Electronic devices such as terminal devices, computer systems, servers, etc. may be described in the general context of computer system executable instructions (such as program modules) being executed by the computer system. Generally, program modules may include routines, programs, object programs, components, logic, data structures, etc., that perform specific tasks or implement specific abstract data types. The computer system/server may be implemented in a distributed cloud computing environment. In the distributed cloud computing environment, tasks are performed by remote processing devices linked through a communications network. In a distributed cloud computing environment, program modules may be stored on local or remote computing system storage media including storage devices.

Exemplary Method

FIG. 1 is a schematic flowchart of a method for displaying a panorama of points outside a model according to an embodiment of the present disclosure. This embodiment may be applied to an electronic device, as shown in FIG. 1, including the following steps.

Step 102, acquiring a target space model including a plurality of first points and at least one guide label.

Each of the guide labels corresponds to a second point whose coordinate position is outside the target space model, and each of the guide labels corresponds to at least one preset first point.

In some embodiments, the target space model may be a model corresponding to a target space with specific boundaries, such as a house, a carriage, etc. The first point is a shooting point inside the target space model, and the target space model may be obtained by rendering image data (for example, panorama, etc.) corresponding to a plurality of first points, or obtained by any method of obtaining the space model provided in the existing technology. The second point is a point outside the target space model, based on each of the second points, image data is collected respectively. However, each of the second points is not based on the target space model. In the target space model, these second points cannot be reached directly through point switching. In some embodiments, the guide label is usually set on the opaque solid boundary of the target space. For example, when the target space is a house, the guide label is set on the wall; when the target space is a carriage, the guide label is set on the solid carriage wall.

Step 104, in response to the panoramic display of the target space model reaching the preset first point, acquiring a panorama of the second point corresponding to the guide label based on received triggering instruction for the guide label.

In this example, based on received walking instruction, viewing angle conversion of the target space model is realized through point conversion between multiple first points, and a panoramic display of the target space model is realized. At each position corresponding to the first point, the target space model may be controlled to achieve viewing angle conversion at that first point through rotation instructions. Due to each guide label corresponding to a second point and at least one preset first point, when moving to the preset first point in the panoramic display of the target space model, the guide label corresponding to the preset first point is visible in the current field of view. At this time, based on trigger instruction for the guide label, by using the guide label as the index, the panorama of the second point corresponding to the guide label may be obtained.

Step 106, initiating display of the panorama corresponding to the second point in the target space model.

In this example, after acquiring the panorama corresponding to the second point, the panorama can be displayed in the target space model, which solves the problem that the second point cannot be reached directly through point conversion in the target space model.

According to the above embodiments of the present disclosure, a method for displaying a panorama of points outside a model is provided, which includes: acquiring a target space model including a plurality of first points and at least one guide label, where each of the guide label corresponds to a second point whose coordinate position is outside the target space model, and each of the guide label corresponds to at least one preset first point; in response to the panoramic display of the target space model reaching the preset first point, acquiring a panorama of the second point corresponding to the guide label based on received triggering instruction for the guide label; and displaying the panorama corresponding to the second point in the target space model. According to some embodiments, by setting a guide label in the target space model, a second point outside the target space model is reached by guide label, and the panorama corresponding to the second point is displayed, which solves the problem of unreachable external points in the model, fully utilizes all point information, and avoids the waste of point resources.

In some exemplary embodiments, based on the embodiment provided in FIG. 1 above, before step 102, it may also include:

determining the at least one guide label in the target space model through a positional relationship between the plurality of first points and the at least one second point in a preset coordinate system.

Figure 2:
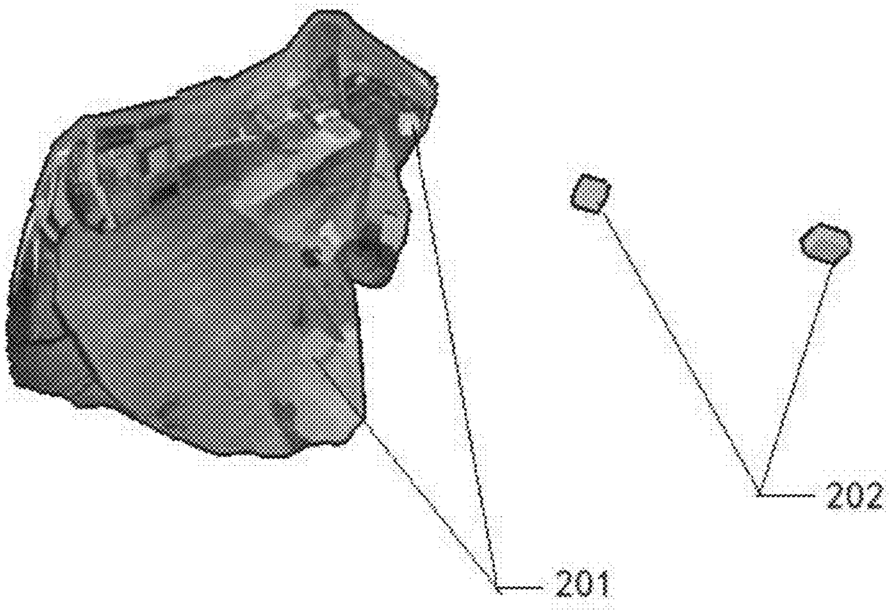
FIG. 2 is a schematic diagram of a positional relationship between a second point and a target space model according to an embodiment of the present disclosure.

The preset coordinate system may be, for example, a world coordinate system, or a coordinate system including three coordinate axes determined with an origin of a corner point in the target space model (for example, with the lower left corner of the target space model as the origin), the x-axis and y-axis of the bottom surface of the target space model are used as the x-axis and y-axis of the preset coordinate system, and the high direction of the target space model is used as the z-axis of the preset coordinate system), etc. This embodiment is not limited to the specific coordinate system, it is only necessary that the first point and the second point are in the same coordinate system. For example, as shown in FIG. 2, the left side of the figure is a section view of the target space model in the preset coordinate system, which includes a plurality of first points 201, and outside the target space model, further includes two second points 202.

In some embodiments, it is expected that the user may be provided with the ability to make a second point visible when walking in panoramic virtual reality (VR). In fact, the second point in the panorama will be invisible due to being rendered outside the target space model (3D space). Therefore, the second point also needs to be mapped to the target space model; in order to acquire the panorama corresponding to the second point based on the guide label, it is necessary to create a guide label for each second point of at least one second point in the target space model. Since each guide label serves as an index of the corresponding second point, the position of the guide label must be related to the position of the second point, and, in order to be uniquely determine the position of the guide label, according to some embodiments, the guide label is determined based on the position between the first point and the second point. In addition, according to some embodiments, any first point may determine a guide label with a second point, but according to some embodiments, the guide label is usually only set on an opaque entity. For example, the guide label is set on the wall of a house model, or on the wall of a carriage model. When the position of the guide label determined by the first point and the second point is on a light-transmitting object (for example, glass, etc.), the guide label determined based on the first point is abandoned, and when a plurality of guide labels determined by a plurality of first points and one second point are located on an opaque entity, one of them may be randomly selected as the guide label corresponding to the second point, or the guide label closest to the second point may be selected as the guide label corresponding to the second point, and the specific method of determining and selecting the guide label is not limit in this embodiment.

In some exemplary embodiments, the determining the at least one guide label in the target space model through a positional relationship between the plurality of first points and the at least one second point in a preset coordinate system includes:

Step a1, determining a plurality of first three-dimensional coordinate information of the plurality of first points in the preset coordinate system, and at least one second three-dimensional coordinate information of the at least one second point in the preset coordinate system information.

Step a2, determining at least one guide label for the at least one second point based on the plurality of first three-dimensional coordinate information and the at least one second three-dimensional coordinate information.

In some embodiments, each point has a set position during image data collection, for example, a three-dimensional coordinate position in the world coordinate system. Therefore, the first three-dimensional coordinate information of each second point in the preset coordinate, and the second three-dimensional coordinate information of each second point in the preset coordinate system are determined. If the coordinate system corresponding to the second point during image data collection is different from the coordinate system corresponding to the first point, the second point may be converted to the coordinate system corresponding to the first point through coordinate system conversion (implemented by the positional relationship between the origins and the direction transformation of the coordinate axes). By the three-dimensional coordinate information corresponding to the first point and the second point, the positional relationship between the second point and the first point can be intuitively expressed under the preset coordinate system. Through the three-dimensional coordinate information of the first point and the second point, a point can be determined on the boundary of the target space model. This point can represent the position and direction relationship between the second point and the target space model. Setting a guide label at this point can clearly express the relationship between the second point and the target space model, which facilitates better correspondence between the panorama and the target space model when viewing the panorama corresponding to the second point.

Optionally, Step a2 in the above embodiment may include:

Step b1, for each of the second point, determining target position of the second point mapped to the target space model based on the second three-dimensional coordinate information corresponding to the second point and the plurality of first three-dimensional coordinate information.

In some embodiments, each second point may determine a plurality of positions with each of the plurality of first points, and each second point has only one actually corresponding guide label. In an example, a position on the opaque entity of the target space model may be determined from a plurality of positions as the target position, and when there is the plurality of positions on the opaque entity of the target space model, one of them may be randomly selected, or based on the distances between the plurality of positions and the second point, the positions with the smallest distance may be selected as the target location.

Step b2, setting a guide label corresponding to the second point at the target position, and determining the first point of the first three-dimensional coordinate information corresponding to the target position as the preset first point.

In some embodiments, the guide label (flag) is used as an index, and the second point corresponding to the guide label may be directly reached based on the guide label. In specific applications, the user may view the panorama of the corresponding second point by clicking on the guide label. The guide label is not visible at all positions in the target space model. Therefore, according to some embodiments, the first point corresponding to the guide label is determined as the preset first point. When walking in the target space model, the guide label may only be seen if the preset first point is reached. Therefore, according to some embodiments, through the guide label, the panorama of the second point outside the model is displayed in the target space model, and through the preset first point, the visibility issue of guide labels within the target space model is solved.

Optionally, Step b1 in the above embodiment may include:

- determining a plurality of connecting lines based on the second three-dimensional coordinate information corresponding to the second point and the plurality of first three-dimensional coordinate information; and
- determining a position of one of the plurality of intersection points as the target position based on a plurality of intersection points of the plurality of connecting lines with a border of the target space model.

In some embodiments, after the second three-dimensional coordinate information corresponding to the second point and the plurality of first three-dimensional coordinate system information are known, the second three-dimensional coordinate information and the first three-dimensional coordinate information correspond to the same preset coordinate system, therefore, in this preset coordinate system, the second coordinate information and the plurality of first three-dimensional coordinate information may be connected respectively to obtain multiple connection lines. When determining the target position from multiple intersection points, it is firstly determined whether the object corresponding to the multiple intersection points in the target space model is an opaque entity (such as a wall, etc.), the intersection points where the corresponding object is not an opaque entity are removed, and one of the remaining intersection points is selected as the target location.

In some optional embodiments, before Step 102, the method may further include:

rendering a space model of a known structure based on the plurality of panoramas corresponding to the plurality of first points to obtain the target spatial model.

Optionally, according to some embodiments, the space model can be rendered through existing panoramic rendering components, such as Sphere Geometry and Box Buffer Geometry of Three.js (commonly used rendering components in the prior art). The panoramic rendering component accepts a panorama or 6 cube images, so as to achieve panoramic rendering. The target space model rendered in some embodiments can be browsed in VR, and different parts of the target space model can be displayed by moving to different first points. The structure of the space model in some embodiments can be acquired by any existing technology, and the manner of acquiring the structure of the space model is not limited in the present disclosure. In addition, the panorama corresponding to the second point in some embodiments can be acquired based on the panoramic image acquiring device (panoramic camera, etc.) at the second point, or based on image data acquired by an ordinary image acquisition device, and the panorama corresponding to the second point is acquired through panorama rendering.

Figure 3:
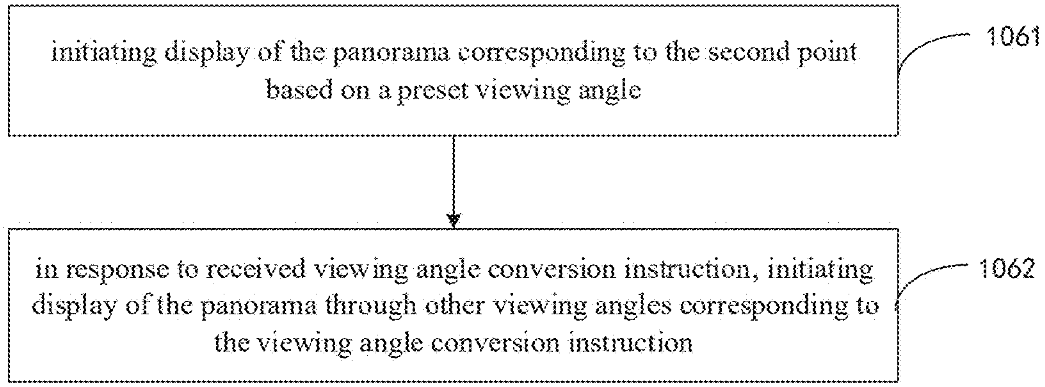
FIG. 3 is a schematic flowchart of Step 106 according to an embodiment shown in FIG. 1 of the present disclosure.

As shown in FIG. 3, based on the above embodiment shown in FIG. 1, Step 106 may include the following steps:

Step 1061, initiating display of the panorama corresponding to the second point based on a preset viewing angle.

The preset viewing angle corresponds to a direction of the preset first point towards the second point.

Figure 4:
FIG. 4 is a schematic diagram displaying a panorama of the second point based on a preset viewing angle according to an embodiment of the present disclosure.

In an example, since the guide label in some embodiments is determined based on the preset first point and the second point (for example, the guide label is set on the connection line between the preset first point and the second point, etc.), therefore, when displaying the panorama corresponding to the second point, the viewing angle direction of the panorama corresponding to the preset first point is firstly displayed, that is, the preset viewing angle corresponds to the preset first point towards the second point. For example, as shown in FIG. 4, in an example, a panorama corresponding to a second point outside the house model is acquired by clicking on the guide label set on the wall, and the panorama is displayed based on the preset viewing angle.

Step 1062, in response to received viewing angle conversion instruction, initiating display of the panorama through other viewing angles corresponding to the viewing angle conversion instruction.

Figure 5:
FIG. 5 is a schematic diagram of a panorama obtained through viewing angle conversion according to an embodiment shown in FIG. 1 of the present disclosure.

In some embodiments, when displaying the panorama corresponding to the second point, the viewing angle of the panorama may also be converted based on the conversion instruction input by the user (for example, by dragging the mouse, etc.) to view information from different viewing angles. For example, as shown in FIG. 5, based on the viewing angle conversion instruction, the panorama in the example shown in FIG. 4 is converted to a preset viewing angle different from that in FIG. 4, and other viewing angles of the panorama are displayed to realize full use of point resources of the second point.

Any method for displaying a panorama of points outside a model according to the embodiments of the present disclosure may be executed by any appropriate device with data processing capabilities, including but not limited to: terminal devices and servers. Or, any method for displaying a panorama of points outside a model according to the embodiments of the present disclosure may be executed by the processor. For example, the processor executes any of the methods for displaying a panorama of points outside a model mentioned in the embodiments of the present disclosure by calling corresponding instructions stored in the memory. No further details will be given below.

Exemplary Device

Figure 6:
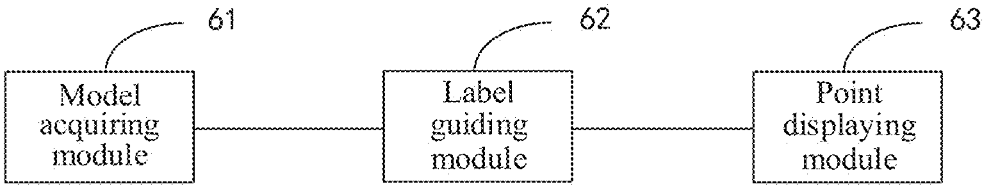
FIG. 6 is a schematic structural diagram of a device for displaying a panorama of points outside the model according to an embodiment of the present disclosure.

FIG. 6 is a schematic structural diagram of a device for displaying a panorama of points outside the model according to an exemplary embodiment of the present disclosure. As shown in FIG. 6, the device according to this embodiment includes:

a model acquiring module 61, configured to acquire a target space model including a plurality of first points and at least one guide label.

Each of the guide labels corresponds to a second point whose coordinate position is outside the target space model, and each of the guide labels corresponds to at least one preset first point.

A label guiding module 62, configured to in response to the panoramic display of the target space model reaching the preset first point, acquire a panorama of the second point corresponding to the guide label based on received triggering instruction for the guide label.

A point displaying module 63, configured to initiate display of the panorama corresponding to the second point in the target space model.

According to the above embodiments of the present disclosure, a device for displaying a panorama of points outside a model is provided, which includes: acquiring a target space model including a plurality of first points and at least one guide label, where each of the guide label corresponds to a second point whose coordinate position is outside the target space model, and each of the guide label corresponds to at least one preset first point; in response to the panoramic display of the target space model reaching the preset first point, acquiring a panorama of the second point corresponding to the guide label based on received triggering instruction for the guide label; and displaying the panorama corresponding to the second point in the target space model. According to some embodiments, by setting a guide label in the target space model, a second point outside the target space model is reached by guide label, and the panorama corresponding to the second point is displayed, which solves the problem of unreachable external points in the model, fully utilizes all point information, and avoids the waste of point resources.

Optionally, according to some embodiments, the device further includes:

a label determining module, configured to determine the at least one guide label in the target space model through a positional relationship between the plurality of first points and the at least one second point in a preset coordinate system.

Optionally, the label determining module include:

- a three-dimensional coordinate unit, configured to determine a plurality of first three-dimensional coordinate information of the plurality of first points in the preset coordinate system, and at least one second three-dimensional coordinate information of the at least one second point in the preset coordinate system information; and
- a guide label unit, configured to determine at least one guide label for the at least one second point based on the plurality of first three-dimensional coordinate information and the at least one second three-dimensional coordinate information.

In an example, the guide label unit is further configured to: for each of the second point, determine target position of the second point mapped to the target space model based on the second three-dimensional coordinate information corresponding to the second point and the plurality of first three-dimensional coordinate information; and set a guide label corresponding to the second point at the target position, and determine the first point of the first three-dimensional coordinate information corresponding to the target position as the preset first point.

In an example, the guide label unit is further configured to: determine a plurality of connecting lines based on the second three-dimensional coordinate information corresponding to the second point and the plurality of first three-dimensional coordinate information; and determine a position of one of the plurality of intersection points as the target position based on a plurality of intersection points of the plurality of connecting lines with a border of the target space model.

In an example, according to some embodiments, the device further includes:

a model rendering module, configured to render a space model of a known structure based on the plurality of panoramas corresponding to the plurality of first points to obtain the target spatial model.

In an example, the point displaying module 63 is further configured to: initiate display of the panorama corresponding to the second point based on a preset viewing angle, where the preset viewing angle corresponds to a direction of the preset first point towards the second point; and in response to received viewing angle conversion instruction, initiate display of the panorama through other viewing angles corresponding to the viewing angle conversion instruction.

Exemplary Electronic Device

Hereinafter, an electronic device according to an embodiment of the present disclosure is described with reference to FIG. 7. The electronic device may be either or both of the first device and the second device, or a stand-alone device independent of them. The stand-alone device may communicate with the first device and the second device to receive input signal collected information from them.

Figure 7:
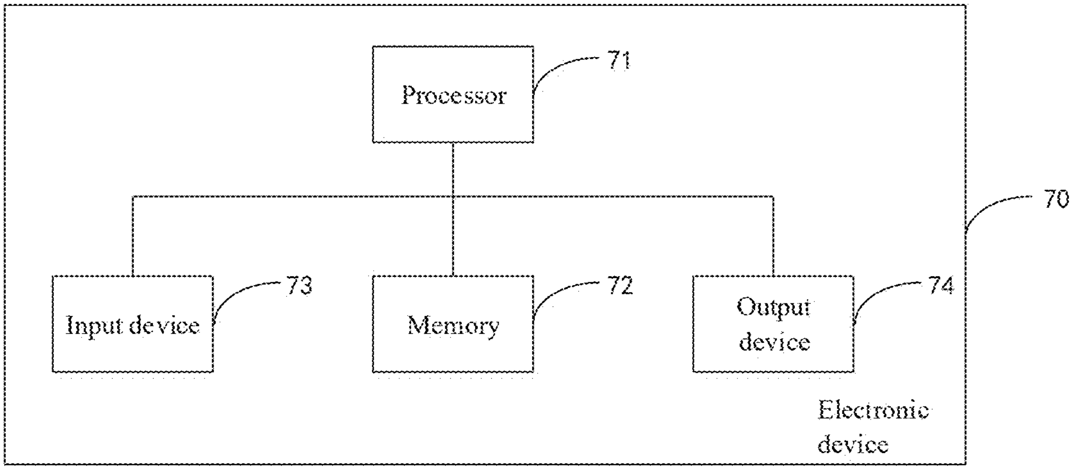
FIG. 7 is a structural diagram of an electronic device according to an embodiment of the present disclosure.

FIG. 7 illustrates a block diagram of an electronic device according to an embodiment of the present disclosure.

As shown in FIG. 7, the electronic device 70 includes one or more processors 71 and memory 72.

The processor 71 may be a central processing unit (CPU) or other form of processing unit with data processing capabilities and/or instruction execution capabilities, and may control other components in the electronic device 61 to perform desired functions.

The memory may store one or more computer program products, and the memory may include various forms of computer-readable storage media, such as volatile memory and/or non-volatile memory. The volatile memory may include, for example, random access memory (RAM) and/or cache memory (cache). The non-volatile memory may include, for example, read-only memory (ROM), hard disk, flash memory, etc. One or more computer program products may be stored on the computer-readable storage medium, and the processor may execute the computer program products to achieve the method for displaying a panorama of points outside a model according to various embodiments of the present disclosure described above and/or other desired functionality.

In an example, the electronic device 70 may also include an input device 73 and an output device 74, these components are interconnected through a bus system and/or other forms of connection mechanisms (not shown).

For example, when the electronic device is a first device or a second device, the input device 73 may be the above-mentioned microphone or microphone array, used to capture the input signal of the sound source. When the electronic device is a stand-alone device, the input device 73 may be a communication network connector for receiving the collected input signals from the first device and the second device.

In addition, the input device 73 may also include, for example, a keyboard, a mouse, and the like.

The output device 74 may output various information to the outside, including determined distance information, direction information, etc. The output device 74 may include, for example, a display, a speaker, a printer, a communication network and remote output devices connected thereto, and the like.

Of course, for simplicity, only some of the components in the electronic device 70 related to the present disclosure are shown in FIG. 7, and components such as buses, input/output interfaces, etc. are omitted. In addition, the electronic device 70 may further include any other suitable components depending on the specific application.

Exemplary Computer Program Products and Computer-Readable Storage Media

In addition to the above methods and devices, embodiments of the present disclosure may also be a computer program product, which includes computer program instructions, when the computer program instructions are executed by a processor, the processor is caused to implement a method for displaying a panorama of points outside a model of according to various embodiments of the present disclosure.

The computer program product may be written with program code for performing operations of embodiments of the present disclosure in any combination of one or more programming languages, including object-oriented programming languages such as JAVA, C++, etc., further includes conventional procedural programming languages, such as the "C" language or similar programming languages. The program code may execute entirely on a computing device of a user, partly on a device of a user, as a stand-alone software package, partly on the computing device of a user and partly on a remote computing device, or entirely on the remote computing device or server execute on.

In addition, embodiments of the present disclosure may also be a computer-readable storage medium having computer program instructions stored thereon. The computer program instructions, when executed by a processor, cause the processor to execute the steps in the method for constructing a scenario space model according to various embodiments of the present disclosure described in the above-mentioned "exemplary method" of this description.

The computer-readable storage medium may be any combination of one or more readable media. The readable medium may be a readable signal medium or a readable storage medium. The readable storage medium may include, for example, but is not limited to, electrical, magnetic, optical, electromagnetic, infrared, or semiconductor systems, devices or components, or any combination thereof. More specific examples (non-exhaustive list) of readable storage media include: electrical connection with one or more conductors, portable disk, hard disk, random access memory (RAM), read only memory (ROM), erasable programmable read-only memory (EPROM or flash memory), optical fiber, portable compact disk read-only memory (CD-ROM), optical storage device, magnetic storage device, or any suitable combination of the above.

The basic principles of the present disclosure have been described above in conjunction with specific embodiments. However, it should be pointed out that the advantages, strength, effects, etc. mentioned in the present disclosure are only examples and not limitations. These advantages, strength, effects, etc. cannot be considered to be each embodiment of the present disclosure must have. In addition, the specific details disclosed above are only for the purpose of illustration and to facilitate understanding, and are not limiting. The above details do not limit the present disclosure to be implemented by using the above specific details.

Each embodiment in this description is described in a progressive manner, and each embodiment focuses on its differences from other embodiments. The same or similar parts between the various embodiments may be referred to each other. For the system embodiment, since it basically corresponds to the method embodiment, the description is relatively simple. For relevant details, reference is made to the partial description of the method embodiment.

The block diagrams of the apparatus, devices, equipment, and systems involved in the present disclosure are only illustrative examples and are not intended to require or imply that they must be connected, arranged, or configured in the manner shown in the block diagrams. As those skilled in the art will recognize, these apparatus, devices, equipment, and systems may be connected, arranged, and configured in any manner. Words such as "includes," "includes," "having," etc. are open-ended terms that mean "including, but not limited to," and may be used interchangeably therewith. As used herein, the words "or" and "and" refer to the words "and/or" and are used interchangeably therewith unless the context clearly dictates otherwise. As used herein, the word "such as" refers to the phrase "such as, but not limited to," and may be used interchangeably therewith.

The methods and devices of the present disclosure may be implemented in many ways. For example, the methods and devices of the present disclosure may be implemented through software, hardware, firmware, or any combination of software, hardware, and firmware. The above order for the steps of the methods is for illustration only, and the steps of the methods of the present disclosure are not limited to the order specifically described above unless otherwise specifically stated. Furthermore, in some embodiments, the present disclosure may also be implemented as programs recorded in recording media, and these programs include machine-readable instructions for implementing methods according to the present disclosure. Thus, the present disclosure also covers recording media storing programs for executing methods according to the present disclosure.

It should also be noted that in the devices, equipment and methods of the present disclosure, each component or each step may be decomposed and/or recombined. These decompositions and/or re-combinations should be considered equivalent versions of the present disclosure.

For the purpose of illustration and description, the above description has been provided. Furthermore, this description is not intended to limit the embodiments disclosed herein to the form disclosed herein. Although multiple exemplary aspects and embodiments have been discussed above, those skilled in the art will recognize certain variations, modifications, alterations, additions, and sub-combinations thereof.

The invention claimed is:

1. A method of displaying a panorama of points outside a model, comprising:
   acquiring a target space model including a plurality of first points and at least one guide label, wherein each guide label of the at least one guide label corresponds to a second point associated with a coordinate position outside the target space model, and each guide label of the at least one guide label corresponds to at least one preset first point;
   in response to a panoramic display of the target space model reaching the at least one preset first point, acquiring a panorama of the second point corresponding to the guide label based on receiving a triggering instruction for the guide label; and
   initiating display of the panorama corresponding to the second point in the target space model.

2. The method of claim 1, wherein before acquiring the target space model, the method further comprises:
   determining the at least one guide label in the target space model through a positional relationship between the plurality of first points and the at least one second point in a preset coordinate system.

3. The method of claim 2, wherein determining the at least one guide label in the target space model through the positional relationship between the plurality of first points and the at least one second point in the preset coordinate system comprises:
   determining a plurality of first three-dimensional (3D) coordinate information of the plurality of first points in the preset coordinate system, and at least one second 3D coordinate information of the at least one second point in the preset coordinate system information; and
   determining the at least one guide label for the at least one second point based on the plurality of first 3D coordinate information and the at least one second 3D coordinate information.

4. The method of claim 3, wherein determining the at least one guide label for the at least one second point based on the plurality of first 3D coordinate information and the at least one second 3D coordinate information comprises:
   for each second point of the at least one second point, determining a target position of the second point mapped to the target space model based on the second 3D coordinate information corresponding to the second point and the plurality of first 3D coordinate information;
   setting a guide label of the at least one guide label corresponding to the second point at the target position; and
   determining, from the plurality of first points, a first point associated with the first 3D coordinate information corresponding to the target position as a preset first point of the at least one preset first point.

5. The method of claim 4, wherein for each second point of the at least one second point, determining the target position of the second point mapped to the target space model based on the second 3D coordinate information corresponding to the second point and the plurality of first 3D coordinate information comprises:
   determining a plurality of connecting lines based on the second 3D coordinate information corresponding to the second point and the plurality of first 3D coordinate information; and
   determining a position of an intersection point of a plurality of intersection points as the target position based on the plurality of intersection points of the plurality of connecting lines with a border of the target space model.

6. The method of claim 1, wherein before acquiring the target space model, the method further comprises:
   rendering a space model of a known structure based on a plurality of panoramas corresponding to the plurality of first points to obtain the target space model.

7. The method of claim 1, wherein initiating display of the panorama corresponding to the second point in the target space model comprises:
   initiating display of the panorama corresponding to the second point based on a preset viewing angle, wherein the preset viewing angle corresponds to a direction of a preset first point of the at least one preset first point towards the second point; and
   in response to receiving a viewing angle conversion instruction, initiating display of the panorama through other viewing angles corresponding to the viewing angle conversion instruction.

8. A device for displaying a panorama of points outside a model, comprising:
   a model acquiring device, configured to acquire a target space model including a plurality of first points and at least one guide label, wherein each guide label of the at least one guide label corresponds to a second point associated with a coordinate position outside the target space model, and each guide label of the at least one guide label corresponds to at least one preset first point;
   a label guiding device, configured to acquire, in response to a panoramic display of the target space model reaching the at least one preset first point, a panorama of the second point corresponding to the at least one guide label based on receiving a triggering instruction for the at least one guide label; and
   a point displaying device, configured to initiate display of the panorama corresponding to the second point in the target space model.

9. The device of claim 8, further comprising:
   a label determining device, configured to determine the at least one guide label in the target space model through a positional relationship between the plurality of first points and the at least one second point in a preset coordinate system.

10. The device of claim 9, wherein the label determining device comprises:
   a three-dimensional (3D) coordinate processor, configured to determine a plurality of first 3D coordinate information of the plurality of first points in the preset coordinate system, and at least one second 3D coordinate information of the at least one second point in the preset coordinate system information; and
   a guide label processor, configured to determine the at least one guide label for the at least one second point based on the plurality of first 3D coordinate information and the at least one second 3D coordinate information.

11. The device of claim 10, wherein the guide label processor is further configured to:
   for each second point of the at least one second point, determine a target position of the second point mapped to the target space model based on the second 3D coordinate information corresponding to the second point and the plurality of first 3D coordinate information;

set a guide label of the at least one guide label corresponding to the second point at the target position; and determine, from the plurality of first points, a first point associated with the first 3D coordinate information corresponding to the target position as the preset first point.

12. The device of claim 11, wherein the guide label processor is further configured to:

determine a plurality of connecting lines based on the second 3D coordinate information corresponding to the second point and the plurality of first 3D coordinate information; and determine a position of an intersection point of a plurality of intersection points as the target position based on the plurality of intersection points of the plurality of connecting lines with a border of the target space model.

13. The device of claim 8, further comprising:

a model rendering device, configured to render a space model of a known structure based on a plurality of panoramas corresponding to the plurality of first points to obtain the target space model.

14. The device of claim 8, wherein the point displaying device is further configured to:

initiate display of the panorama corresponding to the second point based on a preset viewing angle, wherein the preset viewing angle corresponds to a direction of a preset first point of the at least one preset first point towards the second point; and in response to receiving a viewing angle conversion instruction, initiate display of the panorama through other viewing angles corresponding to the viewing angle conversion instruction.

15. An electronic device, comprising:

a memory for storing a computer program product;

a processor for executing the computer program product stored in the memory, wherein the computer program product, when executed, cause the processor to perform:

acquiring a target space model including a plurality of first points and at least one guide label, wherein each guide label of the at least one guide label corresponds to a second point associated with a coordinate position outside the target space model, and each guide label of the at least one guide label corresponds to at least one preset first point;

in response to a panoramic display of the target space model reaching the at least one preset first point, acquiring a panorama of the second point corresponding to the guide label based on receiving a triggering instruction for the guide label; and initiating display of the panorama corresponding to the second point in the target space model.

16. The electronic device of claim 15, wherein before acquiring the target space model, the processor is further configured to perform:

determining the at least one guide label in the target space model through a positional relationship between the plurality of first points and the at least one second point in a preset coordinate system.

17. The electronic device of claim 16, wherein determining the at least one guide label in the target space model through the positional relationship between the plurality of first points and the at least one second point in the preset coordinate system comprises:

determining a plurality of first three-dimensional (3D) coordinate information of the plurality of first points in the preset coordinate system, and at least one second 3D coordinate information of the at least one second point in the preset coordinate system information; and determining the at least one guide label for the at least one second point based on the plurality of first 3D coordinate information and the at least one second 3D coordinate information.

18. The electronic device of claim 17, wherein determining the at least one guide label for the at least one second point based on the plurality of first 3D coordinate information and the at least one second 3D coordinate information comprises:

for each second point of the at least one second point, determining a target position of the second point mapped to the target space model based on the second 3D coordinate information corresponding to the second point and the plurality of first 3D coordinate information;

setting a guide label of the at least one guide label corresponding to the second point at the target position; and determining, from the plurality of first points, a first point associated with the first 3D coordinate information corresponding to the target position as a preset first point of the at least one preset first point.

19. The electronic device of claim 18, wherein for each second point of the at least one second point, determining the target position of the second point mapped to the target space model based on the second 3D coordinate information corresponding to the second point and the plurality of first 3D coordinate information comprises:

determining a plurality of connecting lines based on the second 3D coordinate information corresponding to the second point and the plurality of first 3D coordinate information; and determining a position of an intersection point of a plurality of intersection points as the target position based on the plurality of intersection points of the plurality of connecting lines with a border of the target space model.

20. The electronic device of claim 15, wherein before acquiring the target space model, the processor is further configured to perform:

rendering a space model of a known structure based on a plurality of panoramas corresponding to the plurality of first points to obtain the target space model.

* * * * *